US006613992B2

(12) United States Patent
Whipple

(10) Patent No.: US 6,613,992 B2
(45) Date of Patent: Sep. 2, 2003

(54) MODULE PLATFORM DESIGN FOR PLUG OPERATED SAFETY SWITCH AND CIRCUIT BREAKER

(75) Inventor: Charles E. Whipple, Collierville, TN (US)

(73) Assignee: Thomas & Betts International, Inc., Sparks, NV (US)

( * ) Notice: Subject to any disclaimer, the term of this patent is extended or adjusted under 35 U.S.C. 154(b) by 0 days.

(21) Appl. No.: 10/025,007

(22) Filed: Dec. 19, 2001

(65) Prior Publication Data

US 2002/0092743 A1 Jul. 18, 2002

Related U.S. Application Data

(60) Provisional application No. 60/256,788, filed on Dec. 20, 2000.

(51) Int. Cl.[7] .......................... H01H 9/20; H01R 29/00; H02B 1/20

(52) U.S. Cl. .................... 200/50.28; 200/293; 361/652; 431/188

(58) Field of Search ............................ 200/50.01–50.4, 200/51 R–51.17, 293–307; 439/188; 361/627–638, 652, 673, 825

(56) References Cited

U.S. PATENT DOCUMENTS 3,147,405 A 9/1964 Sturdivan .................. 361/636
3,250,957 A 5/1966 Bristol ....................... 361/635
4,414,440 A * 11/1983 DeCoste .................. 200/50.31
4,498,123 A 2/1985 Fuss et al. .................. 361/825
4,604,505 A * 8/1986 Henninger ................. 200/50.3
4,646,200 A 2/1987 M'Sadoques et al. ....... 361/638
4,667,268 A 5/1987 Mrowka ..................... 361/634
5,046,173 A 9/1991 Wall, Jr. ..................... 361/634
5,635,690 A * 6/1997 Knecht et al. ......... 200/50.3 X
5,761,026 A 6/1998 Robinson et al. ........... 361/627
5,894,404 A 4/1999 Vrnak et al. ................ 361/627
5,998,744 A * 12/1999 Osborn .................... 200/50.28
6,028,273 A 2/2000 Osborn, Jr. .............. 200/51.09

* cited by examiner

*Primary Examiner*—J. R. Scott
(74) *Attorney, Agent, or Firm*—Hoffmann & Baron, LLP

(57) ABSTRACT

The present invention is a power outlet having a face plate connected to a modular platform which is used to support a safety device. The modular platform is sized to accommodate varying sized safety devices, such as circuit breakers. The modular platform can have a plurality of reinforcing members which are used to strengthen the modular platform when supporting the safety device. The modular platform can also include a plurality of reinforcing ribs to further increase the rigidity of the modular platform. A support member is used in conjunction with a circuit breaker placed on the modular platform to further strengthen and stiffen the overall connection between the circuit breaker of the safety device, the modular platform and the face plate.

9 Claims, 5 Drawing Sheets

MODULE PLATFORM DESIGN FOR PLUG OPERATED SAFETY SWITCH AND CIRCUIT BREAKER

CROSS REFERENCE TO RELATED APPLICATIONS

This application claims the benefit of U.S. Provisional Application No. 60/256,788 filed on Dec. 20, 2000, the disclosure of which is incorporated herein by reference.

BACKGROUND OF THE INVENTION

The present invention relates generally to electrical outlets and more particularly to a module platform design for use with a power outlet having a safety device.

It is well known to use power outlets with safety interlocks and safety devices incorporated therein in shipping yards for providing power to refrigerated devices on shipping docks. These power outlets may also be used in any situation where it is necessary to stop the supply of electricity to a plug outlet during either the insertion or removal of the plug or when the plug is not in use with the outlet. In operation, these power outlets with safety interlocks and safety devices have a receptacle which accepts and mates with the plug. This receptacle may have a safety device so that the user may turn off the power to the outlet while a plug is either being inserted or removed.

The outlets typically have a safety device which has a circuit breaker contained therein. Typically, the outlet has a module platform which supports the receptacle and the safety device. The safety device is typically a circuit breaker mounted on the module platform. The module platform and circuit breaker are then connected to a safety mechanism which the user may activate by the use of a simple switch or lever. The circuit breaker would be connected to the electrical power supply such that when the safety lever is turned to the off position, the lever pushes the circuit breaker to stop the electricity from flowing to the receptacle. The user would typically put the lever in the off position so that the plug may be safely inserted or removed from the receptacle without the danger of any electricity going through the receptacle which may cause a spark or a short. After the plug is inserted into the receptacle, the user could then put the safety lever into the on position thereby switching the circuit breaker to the on position to allow electricity to flow to the receptacle and then through the plug which is inserted therein.

The circuit breakers which are used in these power outlets are known in the art. However, there are many different manufacturers of circuit breakers. These various manufacturers of circuit breakers typically make the circuit breakers in different sizes and configurations. Many types of circuit breakers may be used for these power outlets. Due to the different designs of the circuit breakers, the designers of the module platforms must manufacture many different module platforms to support the circuit breakers. These module platforms must securely hold the circuit breakers in place so that they are not jostled or moved inadvertently by the action of the safety device. Since a very secure attachment of the circuit breaker to the module platform must be obtained, various manufacturers of module platforms have made many different sized and in some case, very specific module platforms for each type of circuit breaker.

The problem with current module platforms in use is that they may only be configured to be used with a specific type of circuit breaker. Therefore, should a user need to use many different types of circuit breakers in the field for use with various power outlets, the user must order many different types of module platforms to be used, thereby increasing assembly time and cost.

It would be advantageous to have a module platform which may be universally used with many different circuit breakers and provide sufficient support for the circuit breaker to be held securely in place, thereby eliminating the need to order or use many different types of module platforms.

SUMMARY OF THE INVENTION

The present invention contemplates a power outlet having a module platform design with a safety interlock where the platform may accommodate various sized and shaped circuit breakers. The current design adds a safety interlock using a standard face plate with a modified module platform. The modified module platform is different from current designs in that it is able to accept differently shaped and sized circuit breakers while still providing the same or more structural support to hold the circuit breaker in place than current designs.

The prior art platform design includes a platform bottom with two sidewalls extending upward on each side so that the circuit breaker may then be placed between these two walls and placed on the module platform. The circuit breaker would be limited in its side to side movement by the sidewalls. The problem with the prior design is that the sidewalls while adding structural rigidity to the platform would also limit the size of the circuit breakers that could be placed on the module platform, therefore different sized module platforms were needed to accommodate differently sized circuit breakers.

The present invention is a power outlet having a face plate, a module platform and a modular platform that is reinforced to hold the safety device of varying size. The power outlet preferably has a modular platform which is attached to a face plate. The platform preferably has a flat shape and has a plurality of reinforcing members which extend from the face plate and are attached to the modular platform. The safety device is then preferably attached with the modular platform. In a preferred embodiment, the modular platform has a substantially flat configuration and has a plurality of reinforcing ribs to stiffen the modular platform. In the preferred embodiment, the safety device can be a circuit breaker. Preferably various sized circuit breakers can be attached or mounted to the modular platform. This safety device can also include a safety lever having a first end attached to the circuit breaker and an oppositely positioned second end which extends past the face of the exterior surface of the face plate and can be actuated by the user. In a more preferred embodiment, the power outlet can also have a support member which is attached to both the face plate and the circuit breaker to further strengthen the connection between the modular platform, face plate and the circuit breaker.

As a result of the present invention, it is an advantage to have a power outlet having a modular platform which can support various sized safety devices, namely, circuit breakers.

It is an advantage of the present invention to provide a modular platform which provides support for the various sized circuit breakers so that only one modular platform is needed.

It is still a further advantage of the present invention to have additional support for the modular platform so that the connection between the modular platform and safety device so that the overall rigidity of the power outlet itself in increased.

For a better understanding of the present invention, together with other and further advantages, reference is made to the following detailed description, taken in connection with the accompanying drawings and the scope of the invention will be pointed out in the appended claims.

DETAILED DESCRIPTION OF THE INVENTION

Figure 1:
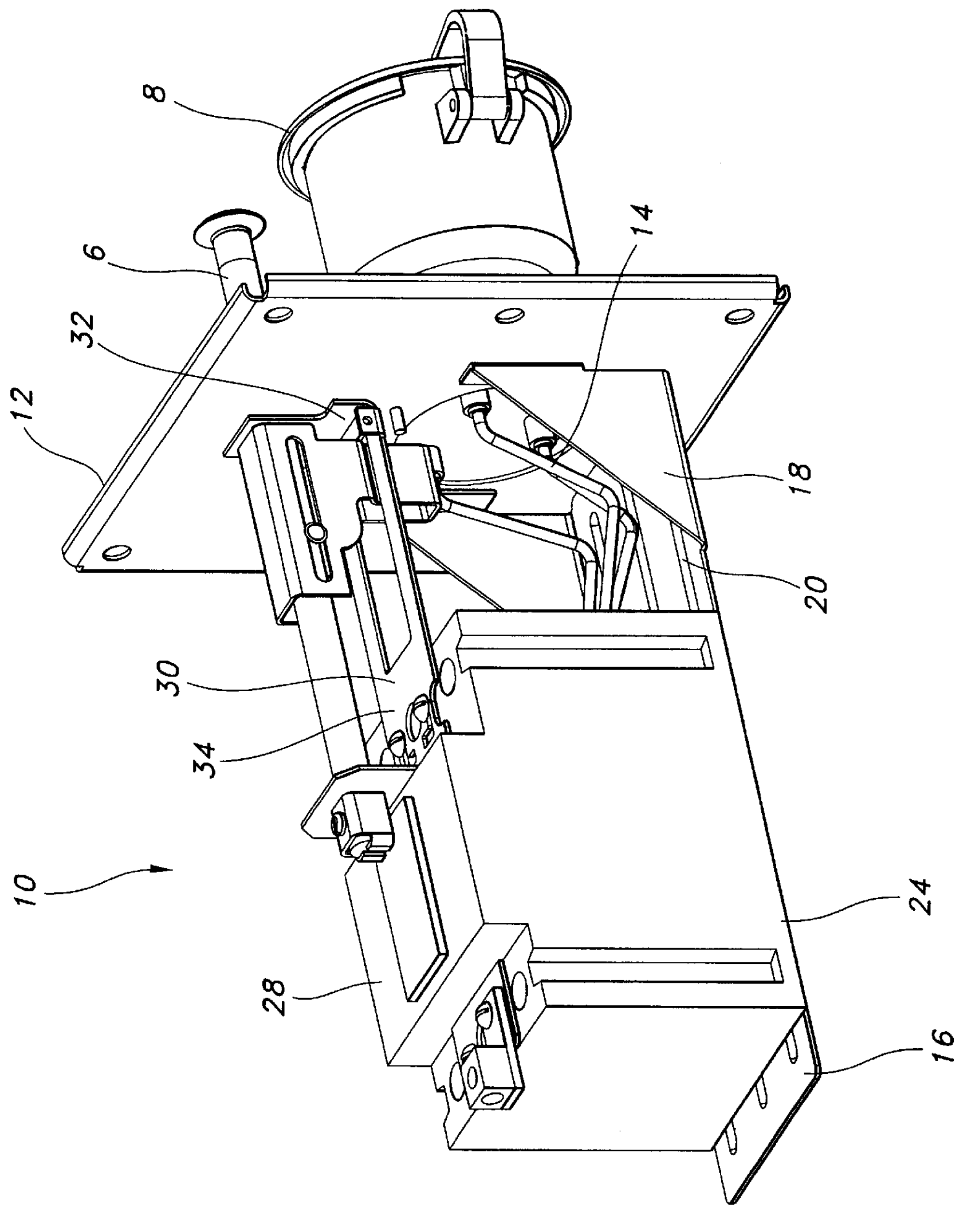
FIG. 1 is a top perspective view of the safety interlock of the present invention.
Figure 2:
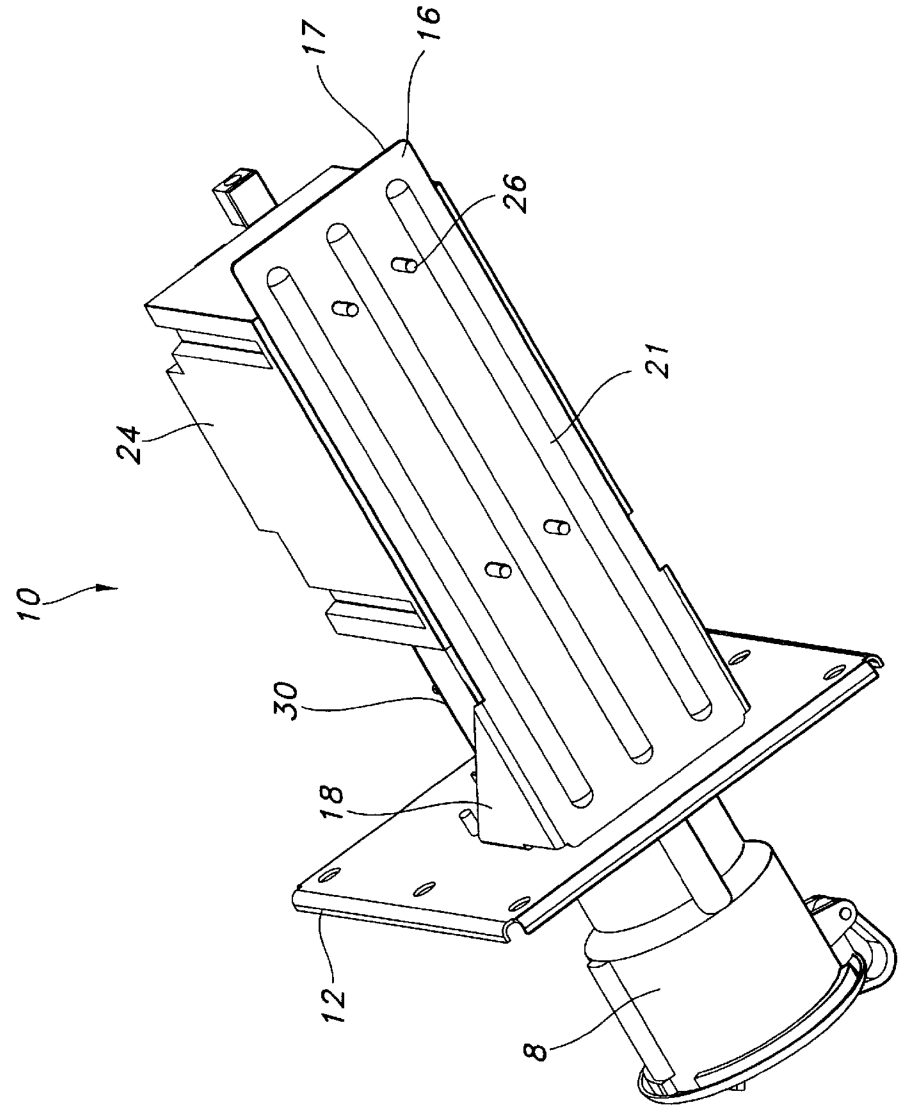
FIG. 2 is a bottom perspective view of the safety interlock of the present invention.

Referring to FIG. 1, a power outlet having a safety interlock 10 is shown. Safety interlock 10 has a face plate 12 having a receptacle hole 14 cut therein for receiving a receptacle 8 that receives a plug (not shown). Attached to the face plate 12 is a module platform 16. The module platform 16 in the preferred embodiment is made of a metallic material. The module platform 16 may be attached by the use of tack welds to the face plate 12. In the preferred embodiment, to further increase the strength of the module platform 16 connection to the face plate 12, reinforcing members 18 are simultaneously attached to the module platform 16 and the face plate 12. In addition, the module platform 16 may have a plurality of reinforcing grooves 20 extending the length of the module platform 16. The reinforcing grooves 20 preferably start at the face plate 12 and extend along the length of the module platform 16 as shown in FIG. 1. Referring to FIG. 2, the reinforcing grooves 20 form corresponding reinforcing ribs 21 on the opposite side of the module platform 16. The reinforcing ribs 21 form the outer contour of the reinforcing grooves 20. The purpose of the grooves 20 and reinforcing ribs 21 is to further increase the structural rigidity of the module platform 16 and prevent bending when weight is applied to the top of the module platform 16.

Figure 3:
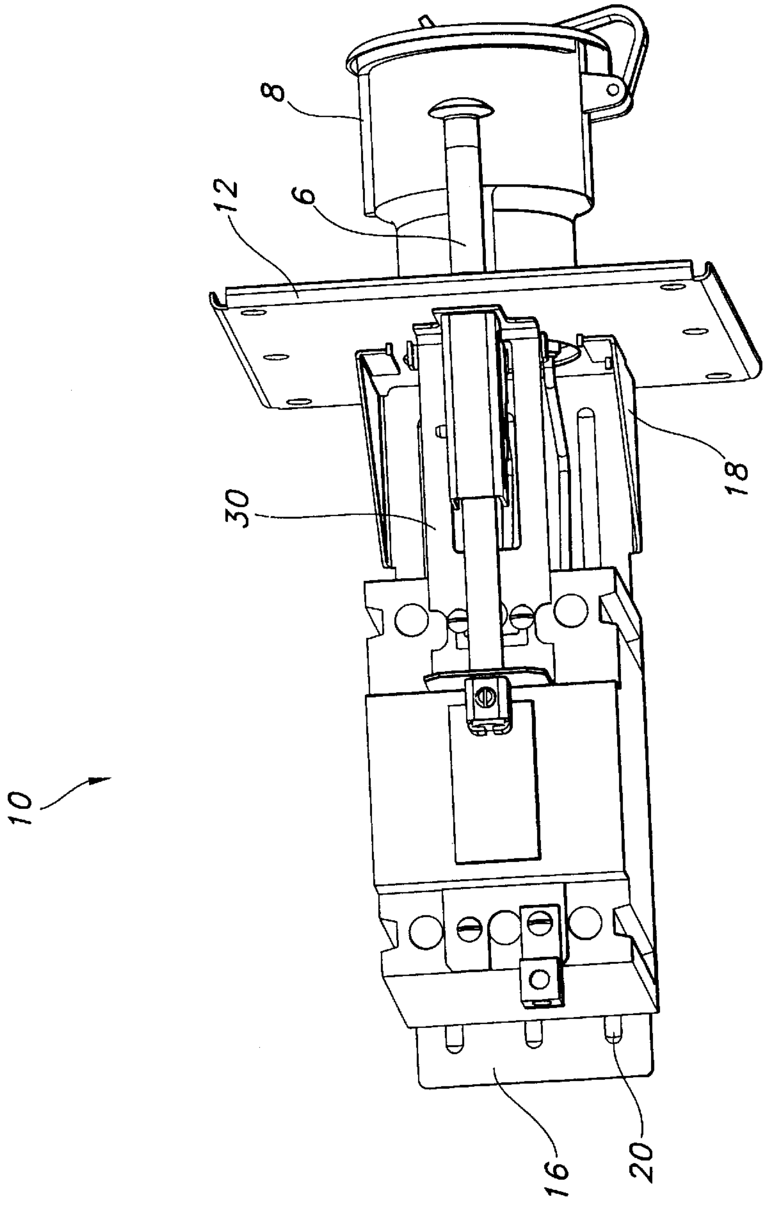
FIG. 3 is a top perspective view of the safety interlock of the present invention.
Figure 4:
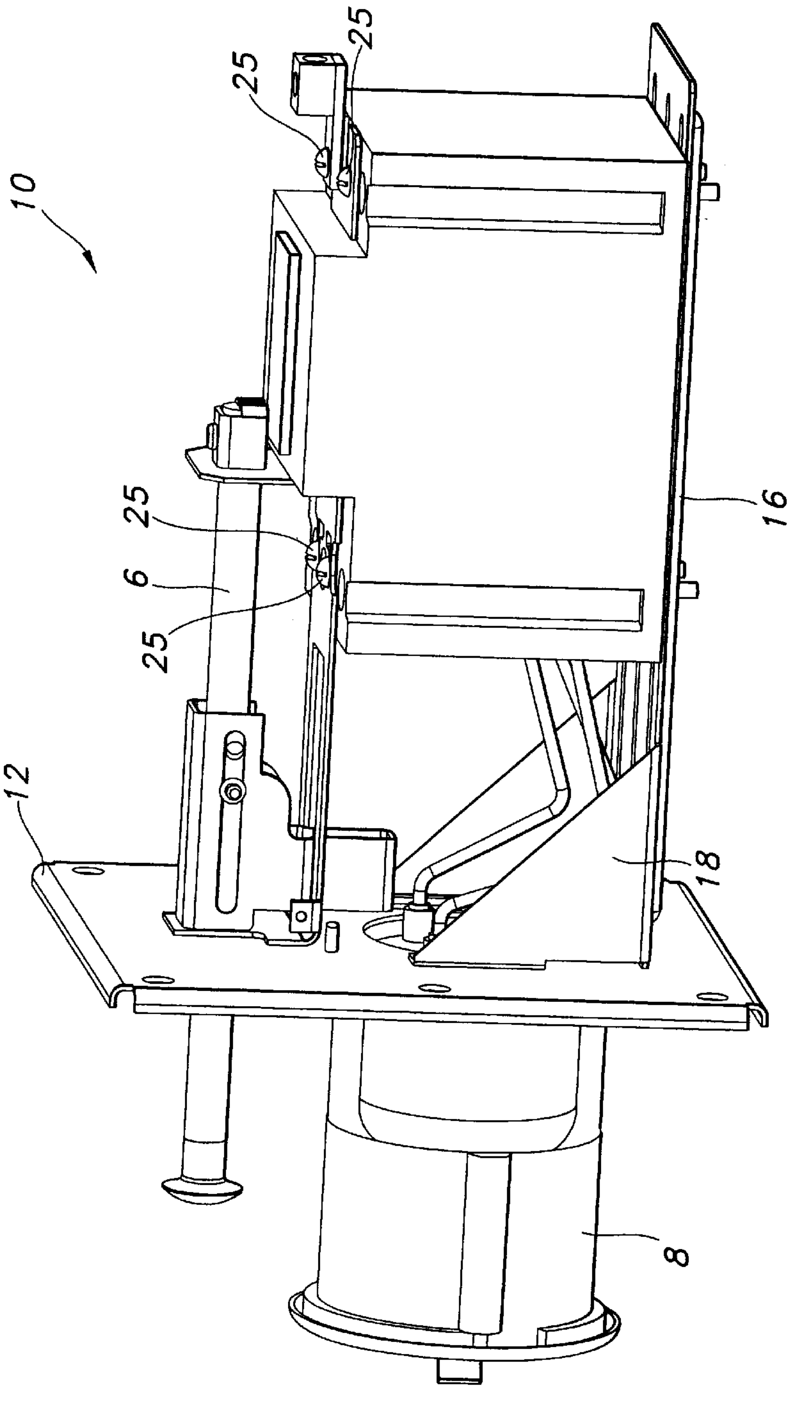
FIG. 4 is a right side elevation view of the safety interlock of the present invention.
Figure 5:
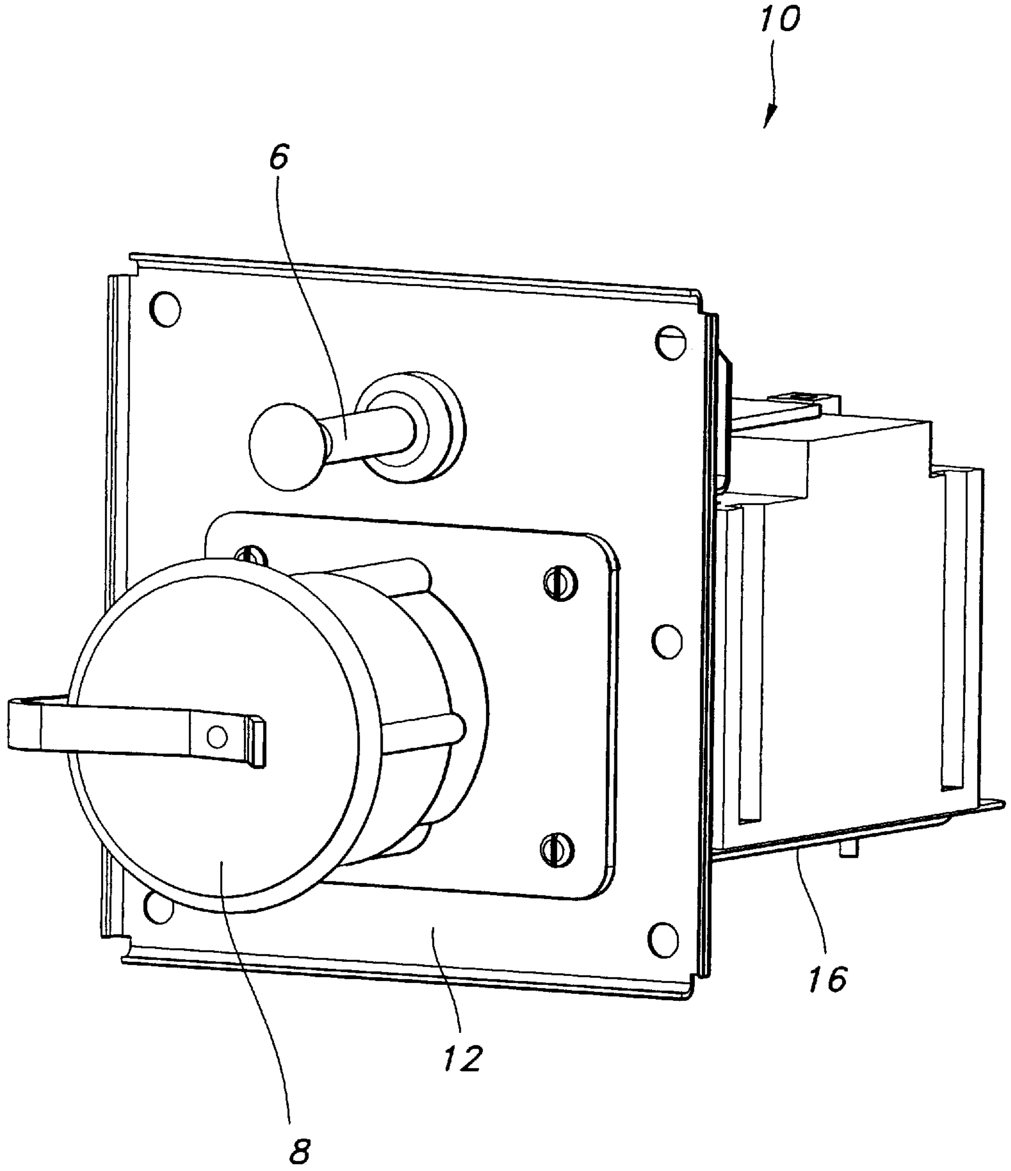
FIG. 5. is a front perspective view of the safety lock of the present invention.

Referring to FIGS. 1, 3 and 4, the module platform 16 is shown to have a circuit breaker 24 attached thereon. The circuit breaker 24 is shown to have a safety lever 6. The safety lever 6 preferably extends through the face plate 12. The safety lever 6 is used to turn the circuit breaker 24 on and off. The circuit breaker 24 is electrically connected to the receptacle 8 to supply electricity to the plug when inserted. The safety lever 6 is used to turn the power off to the receptacle 8 by switching the circuit breaker 24 into an off setting when a plug is inserted or removed. In the alternative, when the plug is properly inserted the safety lever 6 is then positioned to set the circuit breaker 24 to allow electricity to flow to the receptacle 8. As shown in the preferred embodiment, the safety lever 6 is slidably moved to turn the circuit breaker 24 on and off.

Referring now to FIGS. 2 and 4, the circuit breaker may be attached to the module platform 16 by a plurality of screws 25 and self-tapping holes 26 in the module platform. The user would fasten the circuit breaker 24 to the module platform 16 by using the screws 25 that extend through the circuit breaker 24 to the self-tapping holes 26. Since the circuit breaker 24 is positioned on top of the module platform 16 is not limited in its width dimension by any upwardly extending sidewall originating from the module platform peripheral edge 17. In the prior art designs, the upwardly extending sidewalls would limit the size of the circuit breaker 24 that could be placed on the module platform 16.

As shown in FIG. 1, any size circuit breaker 24 may be placed on the module platform 16 since there are no obstructions on the module platform 16. In the preferred embodiment, there is a top support member 30 which is attached at a first end 32 to the face plate 12 and an oppositely positioned second end 34 is attached to a top surface 28 of the circuit breaker 24. In the preferred embodiment, the top support 30 may be made of a metallic material and tack welded to the face plate 12. The second end 34 of the top support 30 can be attached to the circuit breaker by a plurality of screws, thereby securely fastening the top support 30 to the circuit breaker 24.

One advantage of using the top support 30 is that the overall design to the modular platform 16 has increased structural rigidity since the circuit breaker 24 is supported by the module platform 16 and the top support 30.

An additional advantage of having the top support 30 is that the module platform 16 and the top support 30 may be made of a thinner material so that the two supports when used together sufficiently hold the circuit breaker 24 in place. The use of thinner material in both the top support 30 and the module platform 16 has the advantage of reducing the costs associated with building the safety interlock, while at the same time providing a universal safety interlock that may be used with various circuit breakers. In addition, the module platform 16 does not have to be extremely thick in width to support the circuit breaker 24 since the grooves 20 which are disposed within the surface of the module platform 16 resist the bending force placed on the module platform 16 by the circuit breaker weight 24.

Therefore, while there have been described what are presently believed to be preferred embodiments of the present invention, those skilled in the art will realize that other and further changes and modifications can be made thereto without departing from the scope of the invention, and it is intended to claim all such changes and modifications that fall within the scope of the invention.

What is claimed is:

1. A power supplied outlet comprising:

a face plate for accommodating an insertable plug;

a module platform attached to said face plate, said modular platform defining a substantially flat configuration for accommodating a plurality of configurations of circuit breakers;

a safety device attached to said module platform, said safety device being actuable between an on position and an off position, said safety device allowing plug insertion upon actuation to said off position; and at least one reinforcing member extending from said face plate to said module platform for providing structural rigidity for supporting said plurality of configurations of circuit breakers.

2. A power supplied outlet as defined in claim 1, wherein said safety device is a circuit breaker switch.

3. A power supplied outlet as defined in claim 1, wherein said module platform further includes a plurality of reinforcing ribs.

4. A power supplied outlet as defined in claim 2, further including a support member having a first end attached to said face plate and an oppositely positioned second end attached to said circuit breaker switch.

5. A power supplied outlet as defined in claim 2, said safety device further including a safety lever attached to said circuit breaker to activate said circuit breaker, wherein said safety lever has a first end attached to said circuit breaker and an oppositely positioned second end extending past an exterior surface of said face plate.

6. A power outlet for an electrical plug comprising:

a face plate;

a receptacle for accepting the plug, said receptacle extending through a hole in said face plate;

a module platform, said module platform having a substantially flat configuration and said module platform is attached to said face plate;

a safety device attached to said module platform, said safety device being actuable between an on position and an off position, said safety device allowing plug insertion upon actuation to said off position;

at least one reinforcing member, said reinforcing members extending from said face plate and being attached to said module platform; and a support member having a first end attached to said face plate and an oppositely positioned second end attached to said safety device for providing structural rigidity and supporting said safety device.

7. A power outlet as defined in claim 6, wherein said safety device is a circuit breaker switch.

8. A power outlet as defined in claim 6, wherein said module platform further includes a plurality of reinforcing ribs to strengthen said module platform.

9. A power outlet as defined in claim 7, said safety device further including a safety lever attached to said circuit breaker to activate said circuit breaker, wherein said safety lever has a first end attached to said circuit breaker and an oppositely positioned second end extending past an exterior surface of said face plate.

* * * * *